US012598596B2

(12) United States Patent
Mattaparti et al.

(10) Patent No.: US 12,598,596 B2
(45) Date of Patent: Apr. 7, 2026

(54) CHANNEL SELECTION BASED ON MULTI-HOP NEIGHBORING-ACCESS-POINT FEEDBACK

(71) Applicant: Ruckus IP Holdings LLC, Claremont, NC (US)

(72) Inventors: Ravi Kiran Mattaparti, Cupertino, CA (US); Virendra Malaviya, Cupertino, CA (US); Viney Kumar, Fremont, CA (US); Hemant Bhatnagar, Cupertino, CA (US)

(73) Assignee: Ruckus IP Holdings LLC, Horsham, PA (US)

( * ) Notice: Subject to any disclaimer, the term of this patent is extended or adjusted under 35 U.S.C. 154(b) by 329 days.

(21) Appl. No.: 18/208,945

(22) Filed: Jun. 13, 2023

(65) Prior Publication Data

US 2023/0403688 A1 Dec. 14, 2023

Related U.S. Application Data

(60) Provisional application No. 63/351,531, filed on Jun. 13, 2022.

(51) Int. Cl.
*H04W 72/0453* (2023.01)
*H04W 16/18* (2009.01)

(52) U.S. Cl.
CPC ....... *H04W 72/0453* (2013.01); *H04W 16/18* (2013.01)

(58) Field of Classification Search
CPC .. H04W 72/0453; H04W 16/18; H04W 16/10
See application file for complete search history.

(56) References Cited

U.S. PATENT DOCUMENTS

| | | | | |
|---|---|---|---|---|
| 2006/0291413 A1* | 12/2006 | Rossier | ................. | H04W 16/10 370/329 |
| 2008/0080433 A1* | 4/2008 | Cromer | .............. | H04W 72/563 370/338 |
| 2009/0180431 A1* | 7/2009 | Sengupta | .............. | H04W 72/52 370/329 |
| 2015/0098456 A1* | 4/2015 | Nusairat | ........... | H04W 56/0015 370/338 |
| 2015/0207578 A1* | 7/2015 | Ramamurthy | .... | H04W 72/0453 370/338 |

(Continued)

*Primary Examiner* — Santiago Garcia
(74) *Attorney, Agent, or Firm* — Myers Bigel, P.A.

(57) ABSTRACT

During operation, an access point may receive, associated with other access points, information specifying one or more communication-performance metrics associated with the shared band of frequencies. Then, based at least in part on the one or more communication-performance metrics, the access point may determine a proposed channel and/or a proposed channel width for use by the access point during communication in a shared band of frequencies. Moreover, the access point may provide, addressed to the other access points, second information specifying the proposed channel and/or the proposed channel width. Next, the access point may receive, associated with the other access points, feedback about the proposed channel and/or the proposed channel width. Furthermore, based at least in part on the feedback, the access point may select a channel and/or a channel width for use by the access point during communication in the shared band of frequencies.

19 Claims, 8 Drawing Sheets

(56) References Cited

U.S. PATENT DOCUMENTS

| | | | |
|---|---|---|---|
| 2015/0208253 A1* | 7/2015 | Kim | H04L 27/2614 |
| | | | 370/252 |
| 2015/0296508 A1* | 10/2015 | Fan | H04W 72/1273 |
| | | | 370/329 |
| 2016/0119792 A1* | 4/2016 | Cheng | H04W 16/14 |
| | | | 455/454 |
| 2016/0119914 A1* | 4/2016 | Oizumi | H04W 16/14 |
| | | | 370/329 |
| 2016/0135172 A1* | 5/2016 | Sun | H04W 72/21 |
| | | | 370/329 |
| 2016/0174215 A1* | 6/2016 | Zhang | H04L 5/0073 |
| | | | 370/329 |
| 2016/0278074 A1* | 9/2016 | Yang | H04L 1/1812 |
| 2017/0064729 A1* | 3/2017 | Sadek | H04L 5/0053 |
| 2019/0174325 A1* | 6/2019 | Fischer | H04W 72/1263 |
| 2019/0373507 A1* | 12/2019 | Chen | H04W 48/20 |
| 2020/0162938 A1* | 5/2020 | Ansari | H04B 7/0617 |
| 2020/0187011 A1* | 6/2020 | Malichenko | H04W 24/10 |
| 2020/0260463 A1* | 8/2020 | Lovlekar | H04W 76/15 |
| 2023/0403688 A1* | 12/2023 | Mattaparti | H04W 16/18 |
| 2024/0107325 A1* | 3/2024 | Chang | H04W 48/16 |
| 2025/0024369 A1* | 1/2025 | Cherian | H04W 76/11 |

* cited by examiner

200

RECEIVE INFORMATION
210

DETERMINE A PROPOSED CHANNEL AND/
OR A PROPOSED CHANNEL WIDTH
212

PROVIDE SECOND INFORMATION
214

RECEIVE FEEDBACK
216

SELECT A CHANNEL AND/OR
A CHANNEL WIDTH
218

CHANNEL SELECTION BASED ON MULTI-HOP NEIGHBORING-ACCESS-POINT FEEDBACK

CROSS REFERENCE TO RELATED APPLICATIONS

This application claims priority under 35 U.S.C. 119(e) to U.S. Provisional Application Ser. No. 63/351,531, "Channel Selection Based on Multi-Hop Neighboring-Access-Point Feedback," filed on Jun. 13, 2022, by Ravi Kiran Mattaparti, et al., the contents of which are herein incorporated by reference.

FIELD

The described embodiments relate to techniques for collaborative selection of one or more channels and/or one or more channel widths for use during communication in a shared band of frequencies.

BACKGROUND

Many electronic devices are capable of wirelessly communicating with other electronic devices. Notably, these electronic devices can include a networking subsystem that implements a network interface for: a cellular network (UMTS, LTE, 5G Core or 5GC, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points or APs (which are sometimes referred to as basic service sets or BSSs) that communicate wirelessly with each other and with other electronic devices using Wi-Fi, and that provide access to another network (such as the Internet) via IEEE 802.3 (which is sometimes referred to as 'Ethernet').

In existing WLAN, access points typically select channels and/or channel widths for use during communication in a shared band of frequencies (such as the 2.4, 5 and/or 6 GHz band of frequencies) independently of each other. Notably, an access point usually dynamically determines the channel in a given band of frequencies that it uses based on the current wireless conditions in the given band of frequencies in the radio-frequency environment in proximity to the access point (such as a radio-frequency environment that is within wireless range of the access point). For example, the access point may select its channel based on the result or a scan of the radio-frequency environment. Moreover, often the channel width used by the access point is not dynamically determined based on the current wireless conditions in the radio-frequency environment. Instead, the access point may use a predefined or a preconfigured channel width (e.g., 40 MHz). However, these approaches for channel and/or channel width selection are inefficient and typically result in suboptimal service to clients or stations that are associated with the access points.

SUMMARY

In a first group of embodiments, an access point that collaboratively selects one or more channels and/or one or more channel widths for use during communication in a shared band of frequencies is described. This access point includes an interface circuit that communicates with other access points (e.g., via a backbone network, such as an Internet Protocol backbone network). During operation, the access point receives, associated with the other access points, information specifying one or more communication-performance metrics associated with the shared band of frequencies. Then, based at least in part on the one or more communication-performance metrics, the access point determines a proposed channel and/or a proposed channel width for use by the access point during communication in the shared band of frequencies. Moreover, the access point provides, addressed to the other access points, second information specifying the proposed channel and/or the proposed channel width. Next, the access point receives, associated with the other access points, feedback about the proposed channel and/or the proposed channel width. Furthermore, based at least in part on the feedback, the access point selects the channel and/or the channel width for use by the access point during communication in the shared band of frequencies.

Note that the one or more communication-performance metrics may include a received signal strength indication (RSSI), signal-to-noise ratio (SNR), etc.

Moreover, the other access points may include a neighboring access point that is within wireless communication range of the access point and/or a second access point that is outside of wireless communication range of the access point. In some embodiments, the second access point is hidden from the access point and is detectable by one or more of a remainder of the other access points, such as the neighboring access point.

Furthermore, when the feedback indicates that none of the other access points opposes the proposed channel and/or the proposed channel width (e.g., positive feedback), the access point may select the proposed channel as the channel and/or the proposed channel width as the channel width. Alternatively, when the feedback indicates that any of the other access points opposes the proposed channel and/or the proposed channel width (e.g., negative feedback), the access point does not select the proposed channel as the channel and/or the proposed channel width as the channel width. For example, the access point may select a backup channel as the channel and/or a backup channel width as the channel width. Thus, the channel and/or the channel width may be the least probable to have an overlap with a second channel and/or a second channel width associated with at least one of the other access points.

Another embodiment provides one of the other access points.

Another embodiment provides a computer-readable storage medium with program instructions for use with the access point or one of the other access points. When executed by the access point or the one of the other access points, the program instructions cause the access point or the one of the other access points to perform at least some of the aforementioned operations or counterparts to at least some of the aforementioned operations in one or more of the preceding embodiments.

Another embodiment provides a method, which may be performed by the access point or the one of the other access points. This method includes at least some of the aforementioned operations or counterparts to at least some of the aforementioned operations in one or more of the preceding embodiments.

In a second group of embodiments, a computer system that selects one or more channels and/or one or more channel widths for use during communication in a shared band of frequencies is described. This computer system includes an interface circuit that communicates with access points. During operation, the computer system receives, associated with an access point and/or multiple access points, information specifying one or more communication-performance metrics associated with the shared band of frequencies. Then, based at least in part on the one or more communication-performance metrics, the computer system determines the channel and/or the channel width for use by at least an access point in the access points during communication in the shared band of frequencies. Next, the computer system provides, addressed to the access point, second information specifying the selected channel and/or the channel width.

Note that the computer system may include a controller of the access points, which manages and/or configures operation of the access points in a WLAN. Alternatively, or additionally, the computer system may include a cloud-based computer system. This cloud-based computer system may communicate with the access points using wired communication.

Moreover, the one or more communication-performance metrics may include an RSSI, SNR, etc.

Furthermore, a remainder of the access points (which includes access points other than the access point) may include a neighboring access point that is within wireless communication range of the access point and/or a second access point that is outside of wireless communication range of the access point. In some embodiments, the second access point is hidden from the access point and is detectable by one or more of the remainder of the access points, such as the neighboring access point.

Additionally, after the determining and before the providing operation, the computer system may provide third information, addressed to the remainder of the access points, specifying the channel and/or the channel width. Then, the computer system may receive, associated with the remainder of the access points, feedback about the channel and/or the channel width, and the computer system may finalize the channel and/or the channel width based at least in part on the feedback.

Note that, when the feedback indicates that none of the remainder of the access points opposes the proposed channel and/or the proposed channel width, the computer system may select the proposed channel as the channel and/or the proposed channel width as the channel width. Alternatively, when the feedback indicates that any of the remainder of the access points opposes the proposed channel and/or the proposed channel width, the computer system does not select the proposed channel as the channel and/or the proposed channel width as the channel width. For example, the computer system may select a backup channel as the channel and/or a backup channel width as the channel width. Thus, the channel and/or the channel width may be the least probable to have an overlap with a second channel and/or a second channel width associated with at least one of the remainder of the access points.

Moreover, the computer system may receive second feedback specifying a new wireless entity in proximity to one or more of the access points. Based at least in part on the second feedback, the computer system may determine the channel and/or the channel width.

Another embodiment provides one of the access points, such as the access point. Note that the access point may provide a request to the computer system, and the computer system may determine the channel and/or the channel width in response to the request. For example, the access point may provide the request when the access point detects that it is in a congested radio-frequency environment (such as based on a number of retries, a number of neighboring access points and/or a number of associated clients or stations within a time interval, e.g., 1, 5, 10 or 30 min.). In order to restrict the frequency of changes to the channel and/or the channel width, the computer system may only provide the second information once per second time interval (such as 10 min.).

Another embodiment provides a computer-readable storage medium with program instructions for use with the computer system, the access point or one of the remainder of the access points. When executed by the computer system, the access point or the one of the remainder of the access points, the program instructions cause the computer system, the access point or the one of the remainder of the access points to perform at least some of the aforementioned operations or counterparts to at least some of the aforementioned operations in one or more of the preceding embodiments.

Another embodiment provides a method, which may be performed by the computer system, the access point or the one of the remainder of the access points. This method includes at least some of the aforementioned operations or counterparts to at least some of the aforementioned operations in one or more of the preceding embodiments.

This Summary is provided for purposes of illustrating some exemplary embodiments to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
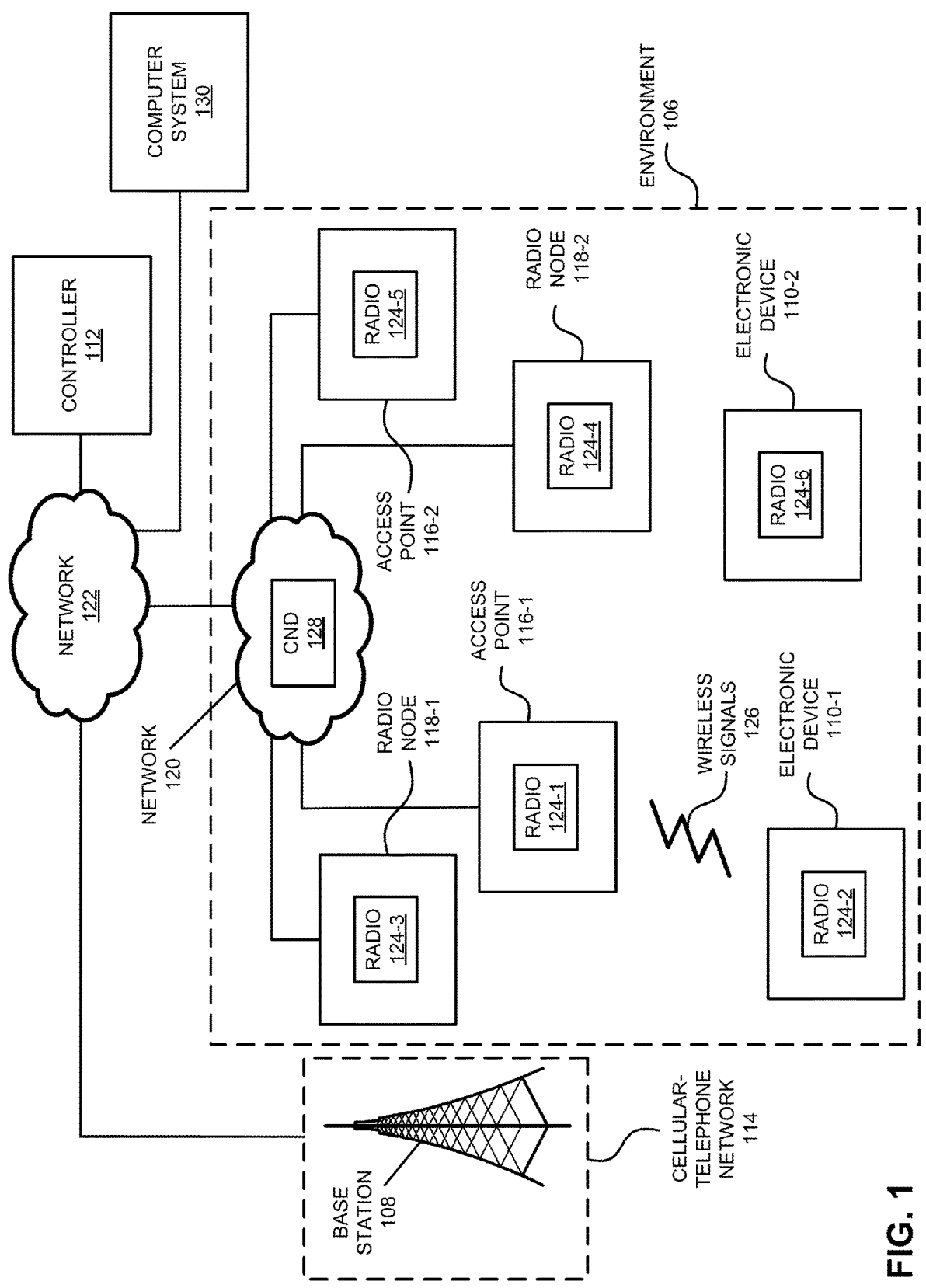
FIG. 1 is a block diagram illustrating an example of communication among electronic devices in accordance with an embodiment of the present disclosure.

In a first group of embodiments, an access point that collaboratively selects one or more channels and/or one or more channel widths for use during communication in a shared band of frequencies is described. During operation, the access point may receive, associated with the other access points, information specifying one or more communication-performance metrics associated with the shared band of frequencies. Then, based at least in part on the one or more communication-performance metrics, the access point may determine a proposed channel and/or a proposed channel width for use by the access point during communication in the shared band of frequencies. Moreover, the access point may provide, addressed to the other access points, second information specifying the proposed channel and/or the proposed channel width. Next, the access point may receive, associated with the other access points, feedback about the proposed channel and/or the proposed channel width. Furthermore, based at least in part on the feedback, the access point may select the channel and/or the channel width for use by the access point during communication in the shared band of frequencies.

By selecting the channel and/or the channel width, these communication techniques may allow the access point to adapt to changes in a radio-frequency environment of the access point. Notably, the communication techniques may allow the access point to have improved situational awareness about wireless conditions in the radio-frequency environment. For example, the access point may be aware of a hidden access point that is outside of wireless range of the access point, but that may overlap with the proposed channel and/or the proposed channel width. Therefore, the communication techniques may allow the access point to select the channel and/or the channel width more efficiently and, thus, to provide improved service (such as improved communication performance) to one or more electronic devices, such as one or more clients or stations that are associated with the access point. Consequently, the communication techniques may improve the user experience when using the access point and/or an electronic device associated with the access point.

In a second group of embodiments, a computer system that selects one or more channels and/or one or more channel widths for use during communication in a shared band of frequencies is described. During operation, the computer system may receive, associated with an access point and/or multiple access points, information specifying one or more communication-performance metrics associated with the shared band of frequencies. Then, based at least in part on the one or more communication-performance metrics, the computer system may determine the channel and/or the channel width for use by at least an access point in the access points during communication in the shared band of frequencies. Next, the computer system may provide, addressed to the access point, information specifying the selected channel and/or the channel width.

By selecting the channel and/or the channel width, these communication techniques may allow the computer system to adapt to changes in a radio-frequency environment of at least the access point. Notably, the communication techniques may allow the computer system to have improved situational awareness about wireless conditions in the radio-frequency environment. For example, the computer system may be aware of a hidden access point that is outside of wireless range of the access point, but that may overlap with the proposed channel and/or the proposed channel width. Therefore, the communication techniques may allow the computer system to select the channel and/or the channel width more efficiently, which may allow the access point to provide improved service (such as improved communication performance) to one or more electronic devices, such as one or more clients or stations that are associated with the access point. Consequently, the communication techniques may improve the user experience when using the access point and/or an electronic device associated with the access point.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth or Bluetooth low energy (BLE), an IEEE 802.15.4 standard (which is sometimes referred to as Zigbee), a low-power wide-area network (LoRaWAN), a cellular-telephone network or data network communication protocol (such as a third generation or 3G communication protocol, a fourth generation or 4G communication protocol, e.g., Long Term Evolution or LTE or 5GC (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network and/or the cellular-telephone network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc.) via a macrocell in a cellular-telephone network 114 (which may include a base station 108), one or more access points 116 (which may communicate using Wi-Fi) in a WLAN and/or one or more radio nodes 118 (which may communicate using LTE) in another cellular-telephone network (such as a small-scale network or a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'computer network device.' Moreover, one or more base stations (such as base station 108), access points 116, and/or radio nodes 118 may be included in one or more wireless networks, such as: a WLAN and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or controller 112 (which may be a local or a cloud-based controller that manages and/or configures access points 116, radio nodes 118 and/or a computer network device (CND) 128, or that provides cloud-based storage and/or analytical services) using a wired communication protocol (such as Ethernet) via network 120 and/or 122. Alternatively, or additionally, access points 116 and/or radio nodes 118 may communicate with computer system 130 (which may include one or more computers at one or more locations) using the wired communication protocol. However, in some embodiments, access points 116 and/or radio nodes 118 may communicate with each other, controller 112 and/or computer system 130 using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers and/or switches (such as computer network device 128).

As described further below with reference to FIG. 8, electronic devices 110, controller 112, access points 116, radio nodes 118, computer network device 128, and/or computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as, but not limited to: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple input, multiple output (MIMO) communication.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, existing approaches for selecting a channel and/or a channel width in a band of frequencies (such as a shared band of frequencies, e.g., one that is accessed using a contention-based channel access protocol, such as carrier sense multiple access with collision avoidance or CSMA CA) may be inefficient and may result in suboptimal communication performance.

Moreover, as discussed in FIGS. 2-7, in order to address these problems one of access points 116 (such as access point 116-1) may implement the communication techniques and may collaboratively select (in conjunction with one or more of a remainder of access points 116) one or more channels and/or one or more channel widths that it will use by access point 116-1 during communication in a shared band of frequencies (such as 2.4, 5 and/or 6 GHz). Notably, access point 116-1 may select the one or more channels and/or the one or more channel widths based at least in part on measured communication-performance metrics from the one or more of the remainder of access points 116 (including access point 116-1) and feedback about the selection from the one or more of the remainder of access points 116.

Notably, access point 116-1 may receive, from one or more of the remainder of access points 116, information specifying one or more communication-performance metrics associated with the shared band of frequencies. For example, the one or more communication-performance metrics may include RSSI, SNR, etc. measurements of received wireless signals associated with one or more of access points 116 in different channels in the shared band of frequencies. Then, based at least in part on the one or more communication-performance metrics, access point 116-1 may determine a proposed channel and/or a proposed channel width for use by access point 116-1 during communication in the shared band of frequencies. Moreover, access point 116-1 may provide, addressed to the remainder of access points 116, second information specifying the proposed channel and/or the proposed channel width. Next, access point 116-1 may receive, associated with the remainder of access points 116, feedback (such as acceptance or opposition) about the proposed channel and/or the proposed channel width. Furthermore, based at least in part on the feedback, access point 116-1 may select the channel and/or the channel width for use by access point 116-1 during communication in the shared band of frequencies.

While the preceding discussion illustrated the communication techniques using a distributed approach, in other embodiments the communication techniques may be, at least in part, implemented in a centralized manner. Notably, in some embodiments, instead of access point 116-1 selecting the one or more channels and/or the one or more channel widths, controller 112 may select the one or more channels and/or the one or more channel widths for use by at least access point 116-1 during the communication in the shared license band of frequencies based at least in part on measured communication-performance metrics from one or more of access points 116.

For example, controller 112 may receive, associated with access point 116-1 and/or access points 116, information specifying one or more communication-performance metrics associated with access points 116 and the shared band of frequencies. In some embodiments, the one or more communication-performance metrics may include RSSI, SNR, etc. measurements of received wireless signals associated with one or more of access points 116 in different channels in the shared band of frequencies. Then, based at least in part on the one or more communication-performance metrics, controller 112 may determine the channel and/or the channel width for use by at least access point 116-1 during communication in the shared band of frequencies. Next, controller 112 may provide, addressed to access point 116-1, second information specifying the selected channel and/or the channel width.

In these ways, the communication techniques may allow a given one of access points 116 and/or controller 112 to adapt to changes in a radio-frequency environment of the given access point. By using a distributed and collaborative approach to measurements of the wireless conditions (such as the one or more communication-performance metrics) in the radio-frequency environment, these communication techniques may provide a more robust and efficient way to select the one or more channels and/or the one or more channel widths for use by the given access point. In the process, the communication techniques may improve situational awareness, such as of one or more hidden access points (which are out of wireless range of at least one of access points 116 and, thus, which may not be detected by at least the one of access points 116). Therefore, the communication techniques may select the one or more channels and/or the one or more channel widths that have the smallest probability of overlap with the channels and/or channel widths of a remainder of access points 116. This capability may allow the given access point to provide improved service (such as improved communication performance, e.g., throughput) to one or more of electronic devices 110, such as one or more clients or stations that are associated with the given access point. Consequently, the communication techniques may improve the user experience when using the given access point and/or an electronic device (such as access point 110-1) associated with the given access point.

Note that, while FIG. 1 illustrates controller 112 and computer system 130 as separate components, in other embodiments these components may be combined into a single component. Thus, in some embodiments, computer system 130 may be a controller.

Figure 2:
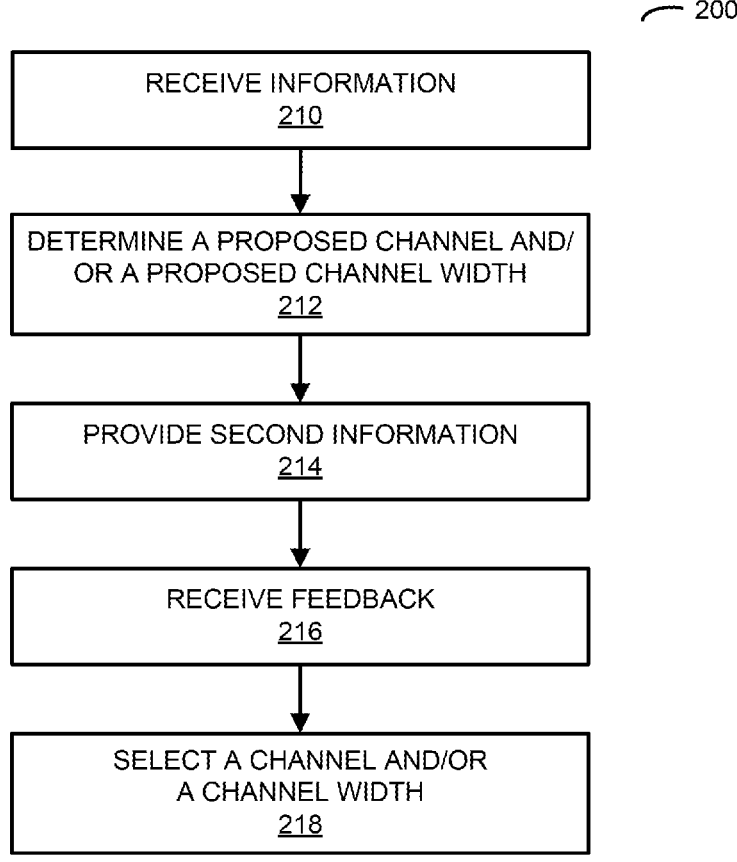
FIG. 2 is a flow diagram illustrating an example of a method for collaboratively selecting a channel and/or a channel width using an access point in FIG. 1 in accordance with an embodiment of the present disclosure.

We now describe embodiments of the method. FIG. 2 presents a flow diagram illustrating an example of a method 200 for collaboratively selecting a channel and/or a channel width, which may be performed by an access point (such as access point 116-1 in FIG. 1) and, more generally, an electronic device. During operation, the access point may receive, associated with other access points, information (operation 210) specifying one or more communication-performance metrics associated with a shared band of frequencies. For example, the information may be received in one or more packets or frames. Note that the one or more communication-performance metrics may include one or more RSSI, SNR, etc. measurements or values. In some embodiments, the one or more communication-performance metrics may include associated channel information and/or an identifier of a given access point in the other access points that performed measurements that determined an instance of the one or more communication-performance metrics.

Moreover, the other access points may include a neighboring access point that is within wireless communication range of the access point and/or a second access point that is outside of wireless communication range of the access point. In some embodiments, the second access point is hidden from the access point and is detectable by one or more of a remainder of the other access points, such as the neighboring access point.

Then, based at least in part on the one or more communication-performance metrics, the access point may determine a proposed channel and/or a proposed channel width (operation 212) for use by the access point during communication in the shared band of frequencies. For example, the proposed channel and/or the proposed channel width may be the least probable to have an overlap with a second channel and/or a second channel width associated with at least one of the other access points. In some embodiments, the determining (operation 212) involves selecting the proposed channel from a set of possible or available channels in the shared band of frequencies, such as: one of channels 1-14 in the 2.4 GHz band of frequencies, one of channels 32-177 in the 5 GHz band of frequencies, or one of the channel sin the 6 GHz band of frequencies.

Furthermore, the access point may provide, addressed to the other access points, second information (operation 214) specifying the proposed channel and/or the proposed channel width. For example, the second information may be provided in one or more packets or frames.

Next, the access point may receive, associated with the other access points, feedback (operation 216) about the proposed channel and/or the proposed channel width. For example, the feedback may be received in one or more packets or frames.

Additionally, based at least in part on the feedback, the access point may select the channel and/or the channel width (operation 218) for use by the access point during communication in the shared band of frequencies. For example, when the feedback indicates that none of the other access points opposes the proposed channel and/or the proposed channel width, the access point may select the proposed channel as the channel and/or the proposed channel width as the channel width. Alternatively, when the feedback indicates that any of the other access points opposes the proposed channel and/or the proposed channel width, the access point does not select the proposed channel as the channel and/or the proposed channel width as the channel width. Instead, the access point may select a backup channel as the channel and/or a backup channel width as the channel width. Thus, the channel and/or the channel width may be the least probable to have an overlap with the second channel and/or the second channel width associated with at least one of the other access points.

Figure 3:
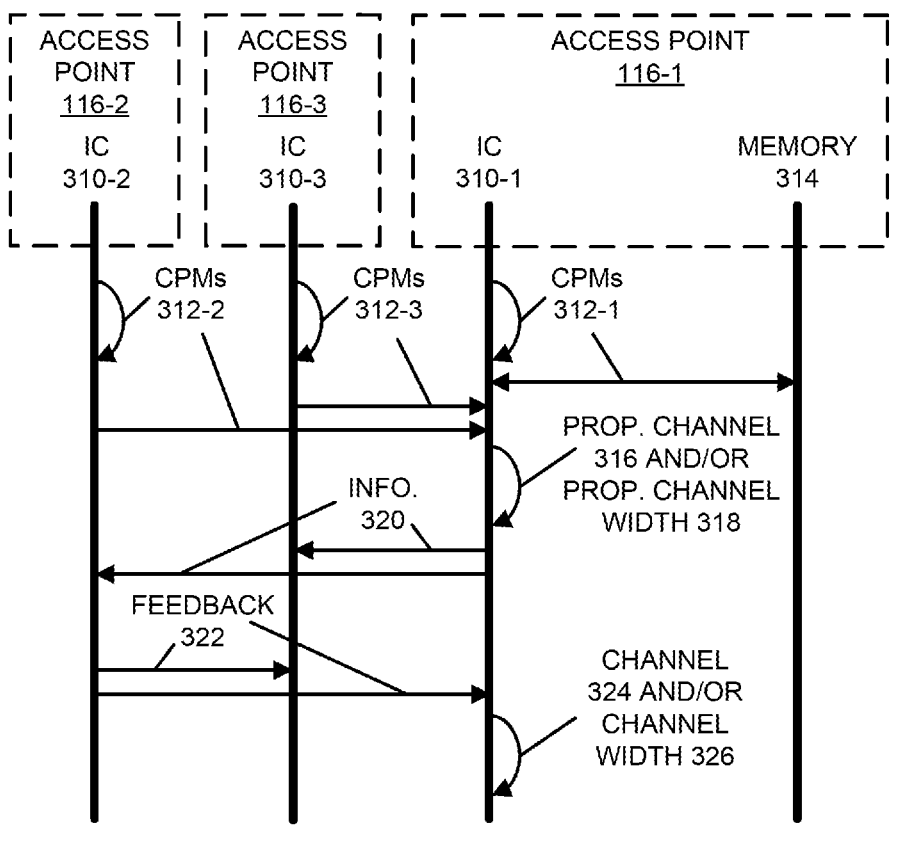
FIG. 3 is a drawing illustrating an example of communication between access points in FIG. 1 in accordance with an embodiment of the present disclosure.

Embodiments of the communication techniques are further illustrated in FIG. 3, which presents a drawing illustrating an example of communication between access point 116-1, access point 116-2 and access point 116-3. In FIG. 3, an interface circuit 310-1 in access point 116-1 may perform a wireless scan of a shared band of frequencies and may measure one or more communication-performance metrics (CPMs) 312-1, which may be stored in memory 314 in access point 116-1. Moreover, interface circuit 310-2 in access point 116-2 may perform a wireless scan of a shared band of frequencies and may measure one or more communication-performance metrics 312-2, which are then provided to access point 116-2. Similarly, interface circuit 310-3 in access point 116-3 may perform a wireless scan of a shared band of frequencies and may measure one or more communication-performance metrics 312-3, which are then provided to access point 116-3.

After receiving the one or more communication-performance metrics 312-2 and 312-3, interface circuit 310-1 may determine, based at least in part on the one or more communication-performance metrics 312-1, 312-2 and 312-3, a proposed channel 316 and/or a proposed channel width 318 for use by access point 116-1 during communication in the shared band of frequencies. Furthermore, interface circuit 310-1 may provide, addressed to access points 116-2 and/or 116-3, information 320 specifying proposed channel 316 and/or proposed channel width 318.

Additionally, after receiving information 320, interface circuits 310-2 and 310-3 may compare proposed channel 316 and/or proposed channel width 318 with channels and/or channel widths used by access points 116-2 and 116-3 (respectively) and may provide feedback 322 about proposed channel 316 and/or proposed channel width 318.

After receiving feedback 322, interface circuit 310-1 may select, based at least in part on feedback 322, channel 324 and/or channel width 326 for use by access point 116-1 during communication in the shared band of frequencies.

Figure 4:
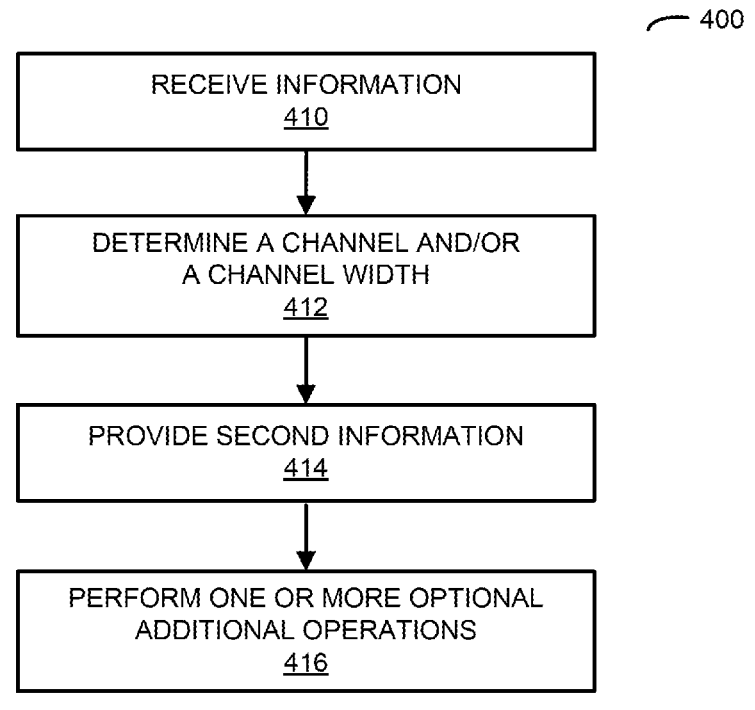
FIG. 4 is a flow diagram illustrating an example of a method for collaboratively selecting one or more channels and/or one or more channel widths using a computer system in FIG. 1 in accordance with an embodiment of the present disclosure.

We now describe alternate embodiments of the method. FIG. 4 presents a flow diagram illustrating an example of a method 400 for collaboratively selecting a channel and/or a channel width, which may be performed by a computer system (such as computer system 130 in FIG. 1). During operation, the computer system may receive, associated with an access point and/or multiple access points, information (operation 410) specifying one or more communication-performance metrics associated with a shared band of frequencies. For example, the information may be received in one or more packets or frames. Note that the one or more communication-performance metrics may include one or more RSSI measurements or values.

Moreover, the computer system may include a controller of the access points, which manages and/or configures operation of the access points in a WLAN. Alternatively, or additionally, the computer system may include a cloud-based computer system. This cloud-based computer system may communicate with the access points using wired communication.

Furthermore, a remainder of the access points may include a neighboring access point that is within wireless communication range of the access point and/or a second access point that is outside of wireless communication range of the access point. In some embodiments, the second access point is hidden from the access point and is detectable by one or more of the remainder of the access points, such as the neighboring access point.

Then, based at least in part on the one or more communication-performance metrics, the computer system may determine the channel and/or the channel width (operation 412) for use by at least an access point in the access points during communication in the shared band of frequencies. For example, when the feedback indicates that none of the remainder of the access points opposes the proposed channel and/or the proposed channel width, the computer system may select the proposed channel as the channel and/or the proposed channel width as the channel width. Alternatively, when the feedback indicates that any of the remainder of the access points opposes the proposed channel and/or the proposed channel width, the computer system does not select the proposed channel as the channel and/or the proposed channel width as the channel width. Instead, the computer system may select a backup channel as the channel and/or a backup channel width as the channel width. Thus, the channel and/or the channel width may be the least probable to have an overlap with a second channel and/or a second channel width associated with at least one of the remainder of the access points. In some embodiments, the determining (operation 412) involves selecting the proposed channel from a set of possible or available channels in the shared band of frequencies, such as: one of channels 1-14 in the 2.4 GHz band of frequencies, one of channels 32-177 in the 5 GHz band of frequencies, or one of the channel sin the 6 GHz band of frequencies.

Next, the computer system may provide, addressed to the access point, second information (operation 414) specifying the selected channel and/or channel width.

In some embodiments, the computer system may perform one or more optional additional operations (operation 416). For example, the computer system may repeat operations 410-414 for one or more additional access points in the chosen access points.

Moreover, after the determining (operation 412) and before the providing (operation 414), the computer system may provide third information, addressed to the remainder of the access points, specifying the channel and/or the channel width. Then, the computer system may receive, associated with the remainder of the access points, feedback about the channel and/or the channel width, and the computer system may finalize the channel and/or the channel width based at least in part on the feedback.

Furthermore, the computer system may receive second feedback specifying a new wireless entity (such as a base station or an eNodeB) in proximity to one or more of the access points. Based at least in part on the second feedback, the computer system may determine the channel and/or the channel width.

In some embodiments of method 200 (FIG. 2) and/or 400, there may be additional or fewer operations. Furthermore, the order of the operations may be changed, and/or two or more operations may be combined into a single operation.

Figure 5:
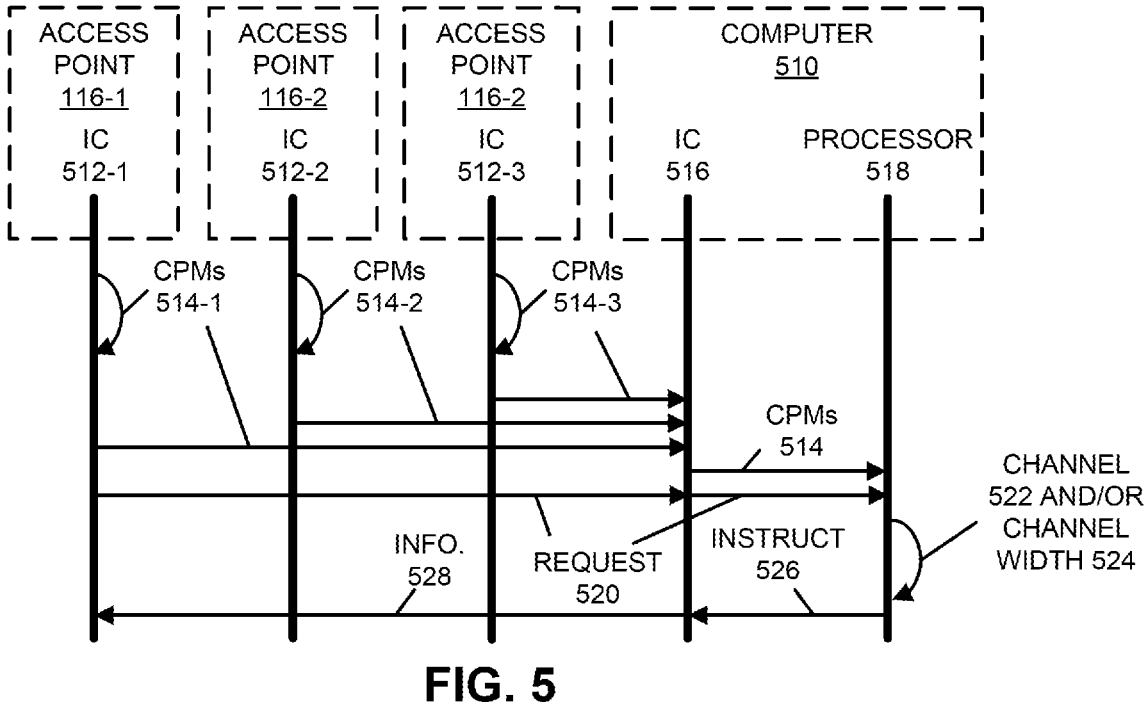
FIG. 5 is a drawing illustrating an example of communication between a computer system and access points in FIG. 1 in accordance with an embodiment of the present disclosure.

Embodiments of the communication techniques are further illustrated in FIG. 5, which presents a drawing illustrating an example of communication between access point 116-1, access point 116-2, access point 116-3 and a computer 510 in computer system 130 (FIG. 1). In FIG. 5, interface circuits 512 in access points 116 may perform wireless scans of a shared band of frequencies and may measure one or more communication-performance metrics 514, which are then provided to computer 510.

After receiving the one or more communication-performance metrics 514, an interface circuit 516 in computer 510 may provide the one or more communication-performance metrics 514 to a processor 518 in computer 510. Then, based at least in part on the one or more communication-performance metrics 514, processor 518 may determine a channel 522 and/or a channel width 524 for use by at least access point 116-1 during communication in the shared band of frequencies.

Next, processor 518 may instruct 526 interface circuit 516 to provide, to access point 116-1, information 528 specifying the selected channel 522 and/or channel width 524. This information may be received by interface circuit 512-1.

In some embodiments, interface circuit 512-1 may provide an optional request 520 to computer 510. After receiving request 520, interface circuit 516 may provide request 520 to processor 518. Then, in response to request 520, processor 518 may determine channel 522 and/or channel width 524 based at least in part on the one or more communication-performance metrics 514.

Note that access point 116-1 may provide request 520 when access point 116-1 detects that it is in a congested radio-frequency environment (such as based on a number of retries, a number of neighboring access points and/or a number of associated clients or stations within a time interval, e.g., 1, 5, 10 or 30 min.). In order to restrict the frequency of changes to channel 522 and/or channel width 524, processor 518 may only determine channel 522 and/or channel width 524 and/or may instruct 526 interface circuit 516 to provide information 528 once per second time interval (such as 10 min.).

While FIGS. 3 and 5 illustrate communication between components using unidirectional or bidirectional communication with lines having single arrows or double arrows, in general the communication in a given operation in this figure may involve unidirectional or bidirectional communication. Moreover, while FIGS. 3 and 5 illustrate operations being performed sequentially or at different times, in other embodiments at least some of these operations may, at least in part, be performed concurrently or in parallel.

We now further describe the communication techniques. Existing Wi-Fi deployments typical use inefficient channel allocation techniques that typical result in suboptimal service to wireless clients or stations. Notably, in many Wi-Fi WLANs, an access point decides to change its channel based at least in part on its neighboring access point, their current wireless conditions, and/or its prevailing radio-frequency environment. Moreover, the access point rarely determines a channel width suitable for prevailing wireless conditions. Instead, the channel width is usually predefined or preconfigured.

Moreover, each access point typically changes its channel independently of each other access points and without considering any hidden access points or nodes in the WLAN. For example, the access point may make its decision based at least in part on data about its radio-frequency environment. However, the access point does not use input from a central entity (such as a controller), which may have access to data about the WLAN and/or heuristics. Consequently, the access point often selects a channel that is already in use by another access point, such as a neighboring access point. This degeneracy or overlap usually results in poorer communication performance.

Furthermore, existing IEEE 80-2.11 communication standards do not explicitly define a mechanism or technique for selecting a channel used by any of the 2.4, 5 or 6 GHz radios. Instead, there are conditions that an access point measures and/or monitors, and the data it collects from its neighboring access points may be used by the access point to determine whether an existing channel is adequate to serve the clients of the access point and to provide consistent throughput and communication performance.

Note that in some embodiments of the communication techniques (which is sometimes referred to as 'channel fly'), an on-channel capacity metric is used to select an optimal channel for a radio based at least in part on neighboring access-point data collection (e.g., using a background scan capability). A background scan may use an on-channel and off-channel aggregate rogue RSSI metric for the optimal channel selection. However, this channel selection may be independently performed by each access point in a WLAN. Thus, each access point makes its own decision about the channel that it uses. Moreover, access points are typically preconfigured with a channel width (such as 40 MHz). This channel width is usually not dynamically changed or adjusted.

In some embodiments of the communication techniques, the channel may be selected based at least in part on current prevailing wireless conditions of an access points and its neighboring access points, which may be at two (or N+1) hop distance. Then, an access point may evaluate its wireless radio-frequency condition based at least in part on the data it received from its own connected clients or station, and radio-frequency conditions and relevant data received from its neighboring access points.

Moreover, as noted previously, the access point may get data from neighboring access points that are two hops away. These access points may report their data via their neighboring access point(s) and/or via wired or wireless access point-to-access point communication. Note that the reported data may include information that specifies free or available channels.

The access point may perform the communication techniques to ensure that the selected channel is distinct and, thus, does not use a channel that is currently used by a neighboring access point. During the communication techniques, the access point may check future channels that are likely to be used by neighboring access points. In this way, the communication techniques may prevent the access point from using or selecting such channels.

After the access point has selected a proposed or potential channel, it may inform its neighboring access points of its intent to use the proposed channel, e.g., using access pointto-access point communication. If the feedback from the neighboring access points is positive, then access point may switch to the selected channel. Alternatively, when there is negative feedback from a near or a far neighboring access point, the access point may decide whether to proceed using the channel or whether to recalculate or select another channel. This new calculation may omit or exclude the previously selected or proposed channel that was rejected or in use by a neighboring access point.

Moreover, when the radio-frequency environment is congested with multiple neighboring access points (which may include a rogue or unauthorized access point in a WLAN), then the access point may select a larger or a smaller channel width. More generally, the access point may select a proposed channel width based at least in part on an amount of congestion. For example, the channel width may include 10×20 MHz or 4×80 MHz.

Figure 6:
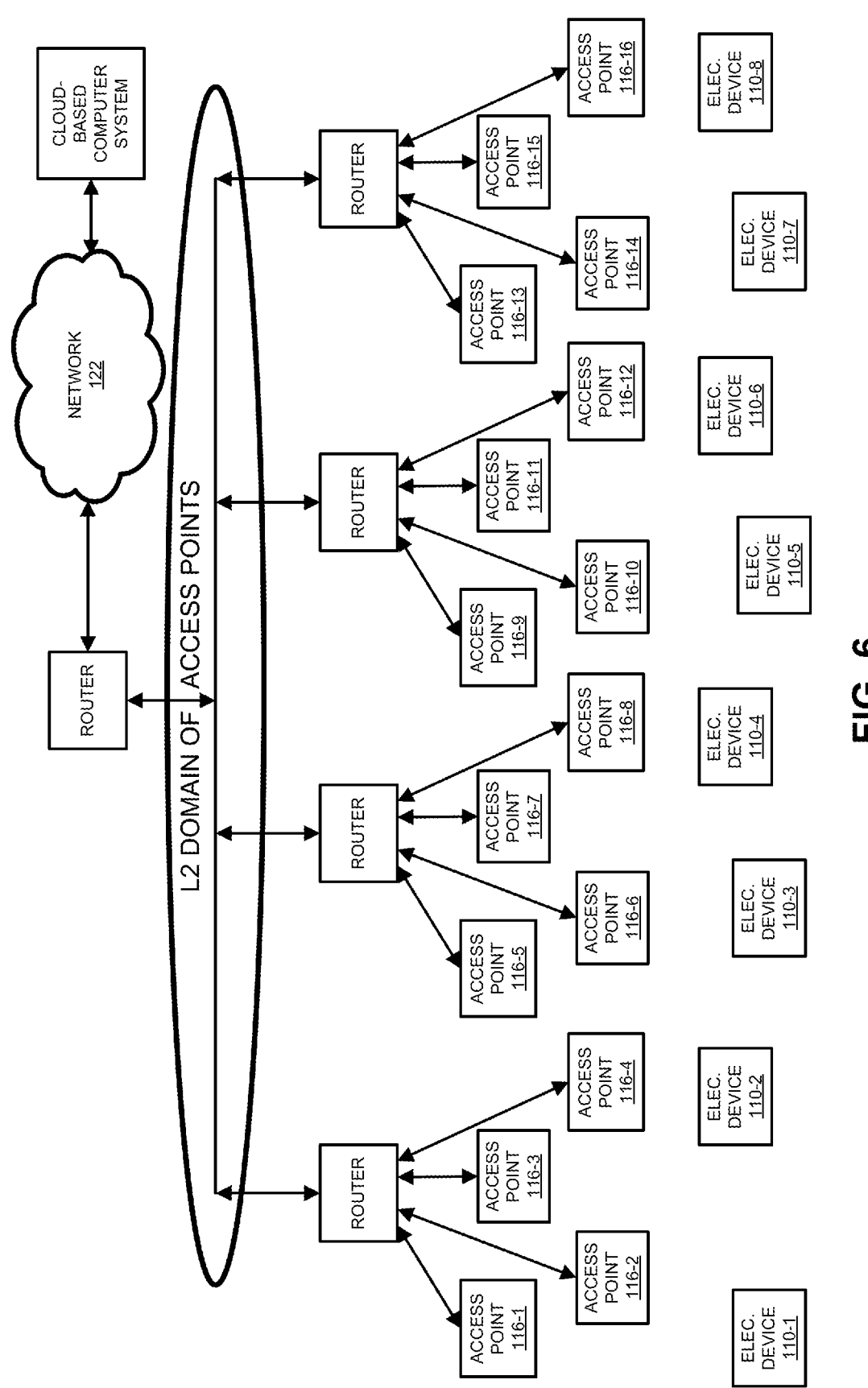
FIG. 6 is a block diagram illustrating an example of communication among electronic devices in accordance with an embodiment of the present disclosure.

FIG. 6 presents a block diagram illustrating an example of communication among electronic devices, such as access points 116. Notably, access point 116-2 may select a channel based at least in part on current prevailing wireless conditions measured by access point 116-2 and neighboring access points that are at a two-hop distance. For example, access point 116-2 may get communication-performance metrics or data from its immediate neighbors (e.g., access point 116-1 and 116-3), including: neighbor RSSI, neighbor SNR, rouge SNR, a number of associated clients or stations, airtime utilization, a current channel, a proposed, potential or candidate channel, etc., as well as data from access points that neighbors of access point 116-3 (such as access points 116-6 and 116-7). Note that the reported data may include information that specifies free or available channels.

The calculation may include the data from the first hop access points and the second hop access points to determine the best channel access point 116-2 can use to avoid reuse of any other channel a neighboring access point may be using (e.g., a current channel of a neighboring access point) or may plan to use. While this example used data from two hops, in some embodiments more-distant access points may be used (such as third hop access points).

Access point 116-2 may also increase or decrease the channel width based at least in part on co-channel interference from neighboring access points and second-hop neighboring access points. This approach may provide a consistent quality of experience to a wireless client of access point 116-2. Note that the channel width may be changed or selected using a similar feedback approach as described previously for channel selection.

In some embodiments, the channel used by an access point may be selected or changed based at least in part on the prevailing wireless conditions of the access point and neighboring access points that are at two-hop distance, and instructions from a local or cloud-based controller or computer system. Notably, the access point may receive data from its associated clients, may perform measurements and may receive data from neighboring access points. Then, the access point may report the data and the measurements to the controller or the computer system. Moreover, each of the access points may report similar data and measurements about themselves and from their clients and neighboring access points (including any rogue or unauthorized access points) to the controller or the computer system (e.g., periodically, or when requested or needed).

Next, the controller or the computer system (such as a cloud-based computer system) may determine the channel for the access point (or the channels for the access points) based at least in part on the data and/or heuristics or predefined rules. Furthermore, the controller or the computer system may inform the access point(s) the determine channel(s). In some embodiments, the controller or the computer system may determine the channel width for the access point (or the channel widths for the access points) based at least in part on the data and/or heuristics or predefined rules. After receiving information specifying the channel and/or the channel width, a given access point may notify its clients or stations about the change(s).

Note that in some embodiments, the controller or the computer system may use historical data to identify a channel that is heavily used by a rogue access point. Then, the controller or the computer system may instruct remaining access point (which are other than the rogue access point, and which may be in wireless range or proximity to the rogue access point) to not use the channel.

Figure 7:
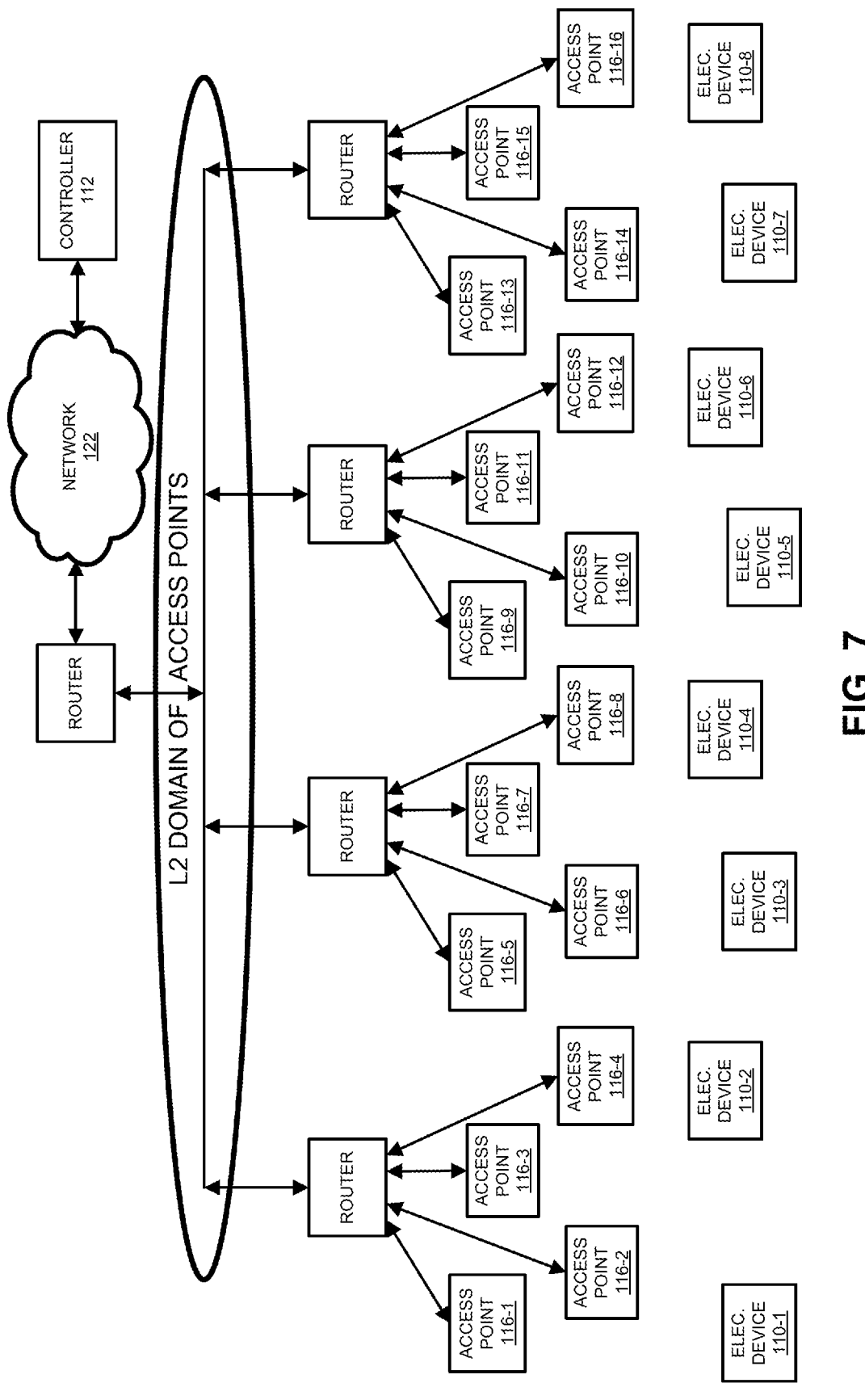
FIG. 7 is a block diagram illustrating an example of communication among electronic devices in accordance with an embodiment of the present disclosure.

FIG. 7 presents a block diagram illustrating an example of communication among electronic devices, such as access points 116 and controller 112. In general, note that the locations of access points 116 in the WLANs shown in FIGS. 6 and 7 is static (i.e., the locations do not dynamically change).

As shown in FIG. 7, controller 112 processes data received from each of access points 116 and their neighboring access points 116 to determine one or more channels and/or one or more channel widths for use by one or more of access points 116. Note that the determination may be based at least in part on prevailing wireless conditions of access points 116, such as: a number of clients or stations, an RSSI the determines a relationship between a given access point and its neighboring access point, reported modulation coding schemes (MCSs), an average throughput that the given access points and its neighboring access point delivered to their wireless clients using their respective current channels, a traffic type (such as an access category, e.g., voice, video, best effort, background data, etc.), and/or another factor. The reported data may include information that specifies free or available channels. In some embodiments, controller 112 may use the approach in the communication techniques to recommend one or more initial channels and/or one or more initial channel widths for a new WLAN that is about to or is being deployed.

We now describe embodiments of an electronic device, which may perform at least some of the operations in the communication techniques. FIG. 8 presents a block diagram illustrating an example of an electronic device 800 in accordance with some embodiments, such as one of: base station 108, one of electronic devices 110, controller 112, one of access points 116, one of radio nodes 118, computer network device 128, or computer system 130. This electronic device includes processing subsystem 810, memory subsystem 812, and networking subsystem 814. Processing subsystem 810 includes one or more devices configured to perform computational operations. For example, processing subsystem 810 can include one or more microprocessors, graphics processing units (GPUs), ASICs, microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include DRAM, static random access memory (SRAM), and/or other types of memory. In some embodiments, instructions for processing subsystem 810 in memory subsystem 812 include: one or more program modules or sets of instructions (such as program instructions 822 or operating system 824, such as Linux, UNIX, Windows Server, or another customized and proprietary operating system), which may be executed by processing subsystem 810. Note that the one or more computer programs, program modules or instructions may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more nodes, such as antenna nodes 808, e.g., a metal pad or a connector, which can be coupled to the one or more antennas 820, or nodes 806, which can be coupled to a wired or optical connection or link. Thus, electronic device 600 may or may not include the one or more antennas 820. Note that the one or more nodes 806 and/or antenna nodes 808 may constitute input(s) to and/or output(s) from electronic device 800.) For example, networking subsystem 814 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 800 may be adapted or changed using pattern shapers (such as directors or reflectors) and/or one or more antennas 820 (or antenna elements), which can be independently and selectively electrically coupled to ground to steer the transmit antenna pattern in different directions. Thus, if one or more antennas 820 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 800 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Moreover, electronic device 800 may include a user-interface subsystem 830, such as: a mouse, a keyboard, a trackpad, a stylus, a voice-recognition interface, and/or another human-machine interface. In some embodiments, user-interface subsystem 830 may include or may interact with a touch-sensitive display in display subsystem 826.

Electronic device 800 can be (or can be included in) any electronic device with at least one network interface. For example, electronic device 800 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8.

Figure 8:
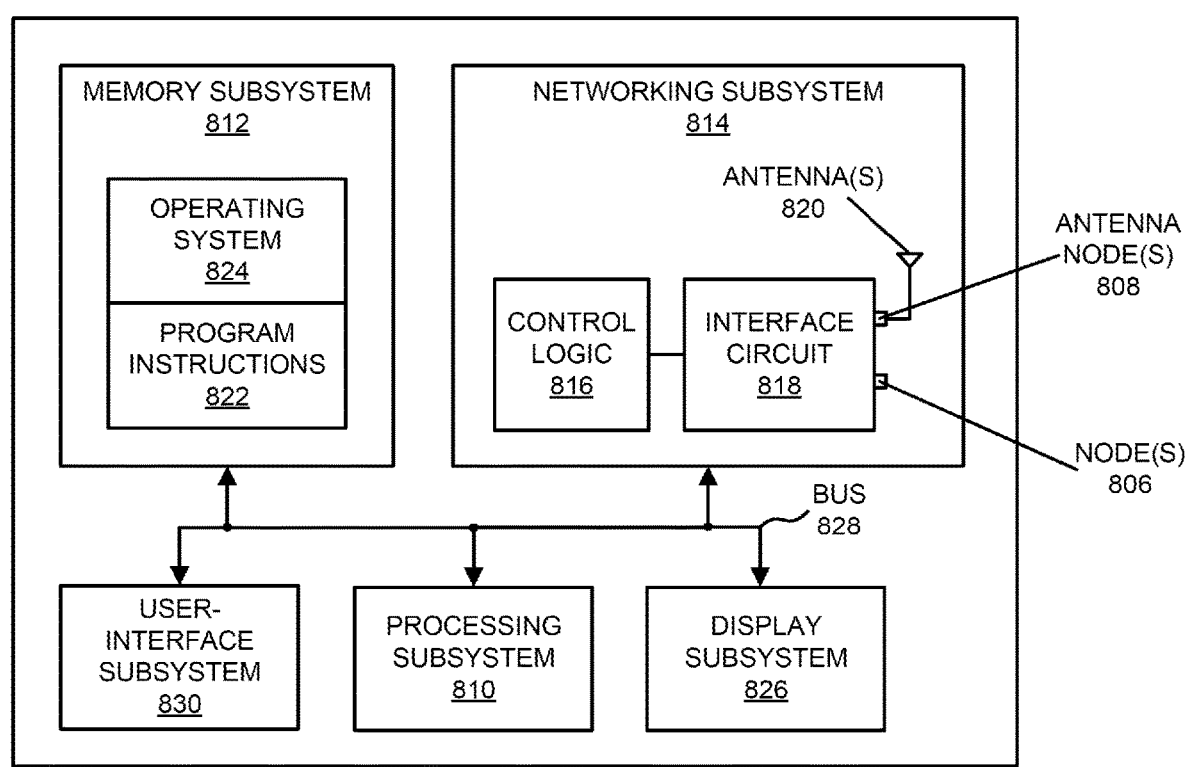
FIG. 8 is a block diagram illustrating an example of an electronic device in accordance with an embodiment of the present disclosure.

Also, although separate subsystems are shown in FIG. 8, in some embodiments some or all of a given subsystem or component can be integrated into one or more of the other subsystems or component(s) in electronic device 800. For example, in some embodiments instructions 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814 and/or of electronic device 800. The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape, an optical, a magnetic disk or a solid-state disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OA-SIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 822, operating system 824 (such as a driver for interface circuit 818) or in firmware in interface circuit 818. Alternatively, or additionally, at least some of the operations in the communication techniques may be implemented in a physical layer, such as hardware in interface circuit 818.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an interface circuit configured to communicates with other access points, wherein the access point is configured to:
receive, associated with the other access points, information specifying one or more communication-performance metrics associated with a shared band of frequencies;
determine, based at least in part on the one or more communication-performance metrics, a proposed channel, a proposed channel width, or both for use by the access point during communication in the shared band of frequencies;
provide, addressed to the other access points, second information specifying the proposed channel, the proposed channel width, or both;

receive, associated with the other access points, feedback about the proposed channel, the proposed channel width, or both; and select, based at least in part on the feedback, a channel, a channel width, or both for use by the access point during communication in the shared band of frequencies, wherein, when the feedback indicates that none of the other access points opposes the proposed channel, the proposed channel width, or both, the access point is configured to select the proposed channel as the channel, the proposed channel width as the channel width, or both.

2. The access point of claim 1, wherein the one or more communication-performance metrics comprises a received signal strength indication (RSSI), a signal-to-noise ratio (SNR), or a traffic associated with a type of application.

3. The access point of claim 1, wherein the other access points comprise: a neighboring access point that is within wireless communication range of the access point, a second access point that is outside of wireless communication range of the access point, or both.

4. The access point of claim 3, wherein the second access point is hidden from the access point and is detectable by one or more of a remainder of the other access points.

5. The access point of claim 1, wherein, when the feedback indicates that any of the other access points opposes the proposed channel, the proposed channel width, or both, the access point is configured to not select the proposed channel as the channel, the proposed channel width as the channel width, or both.

6. The access point of claim 5, wherein the access point is configured to select a backup channel as the channel, a backup channel width as the channel width, or both.

7. The access point of claim 1, wherein the channel, the channel width, or both is the least probable to have an overlap with a second channel, a second channel width, or both associated with at least one of the other access points.

8. A non-transitory computer-readable storage medium for use in conjunction with an access point, the computer-readable storage medium storing program instructions that, when executed by the access point, cause the access point to perform operations comprising:

receiving, associated with other access points, information specifying one or more communication-performance metrics associated with a shared band of frequencies;

determining, based at least in part on the one or more communication-performance metrics, a proposed channel, a proposed channel width, or both for use by the access point during communication in the shared band of frequencies;

providing, addressed to the other access points, second information specifying the proposed channel, the proposed channel width, or both;

receiving, associated with the other access points, feedback about the proposed channel, the proposed channel width, or both; and selecting, based at least in part on the feedback, a channel, a channel width, or both for use by the access point during communication in the shared band of frequencies, wherein, when the feedback indicates that none of the other access points opposes the proposed channel, the proposed channel width, or both, the access point is configured to select the proposed channel as the channel, the proposed channel width as the channel width, or both.

9. The non-transitory computer-readable storage medium of claim 8, wherein the other access points comprise: a neighboring access point that is within wireless communication range of the access point, a second access point that is outside of wireless communication range of the access point, or both.

10. The non-transitory computer-readable storage medium of claim 8, wherein, when the feedback indicates that any of the other access points opposes the proposed channel, the proposed channel width, or both, the operations comprise selecting a backup channel as the channel, a backup channel width as the channel width, or both.

11. The non-transitory computer-readable storage medium of claim 8, wherein the channel, the channel width, or both is the least probable to have an overlap with a second channel, a second channel width, or both associated with at least one of the other access points.

12. A method for collaboratively selecting a channel, a channel width, or both, comprising:

by an access point:

receiving, associated with other access points, information specifying one or more communication-performance metrics associated with a shared band of frequencies;

determining, based at least in part on the one or more communication-performance metrics, a proposed channel, a proposed channel width, or both for use by the access point during communication in the shared band of frequencies;

providing, addressed to the other access points, second information specifying the proposed channel, the proposed channel width, or both;

receiving, associated with the other access points, feedback about the proposed channel, the proposed channel width, or both; and selecting, based at least in part on the feedback, the channel, the channel width, or both for use by the access point during communication in the shared band of frequencies, wherein, when the feedback indicates that none of the other access points opposes the proposed channel, the proposed channel width, or both, the access point is configured to select the proposed channel as the channel, the proposed channel width as the channel width, or both.

13. The method of claim 12, wherein the one or more communication-performance metrics comprises a received signal strength indication (RSSI), a signal-to-noise ratio (SNR), or a traffic associated with a type of application.

14. The method of claim 12, wherein the other access points comprise: a neighboring access point that is within wireless communication range of the access point, a second access point that is outside of wireless communication range of the access point, or both.

15. The method of claim 14, wherein the second access point is hidden from the access point and is detectable by one or more of a remainder of the other access points.

16. The method of claim 12, wherein, when the feedback indicates that any of the other access points opposes the proposed channel, the proposed channel width, or both, the method comprises selecting a backup channel as the channel, a backup channel width as the channel width, or both.

17. The method of claim 12, wherein the channel, the channel width, or both is the least probable to have an overlap with a second channel, a second channel width, or both associated with at least one of the other access points.

18. The non-transitory computer-readable storage medium of claim 8, wherein the one or more communication-performance metrics comprises a received signal strength indication (RSSI), a signal-to-noise ratio (SNR), or a traffic associated with a type of application.

19. The method of claim 12, wherein the method comprises selecting a backup channel as the channel, a backup channel width as the channel width, or both.

* * * * *